United States Patent
Iwamura et al.

(10) Patent No.: US 8,391,905 B2
(45) Date of Patent: Mar. 5, 2013

(54) MOBILE COMMUNICATION METHOD AND MOBILE STATION

(75) Inventors: Mikio Iwamura, Yokohama (JP); Anil Umesh, Yokohama (JP); Seigo Harano, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 6 days.

(21) Appl. No.: 12/989,115

(22) PCT Filed: Dec. 24, 2009

(86) PCT No.: PCT/JP2009/071434
§ 371 (c)(1), (2), (4) Date: Jan. 20, 2011

(87) PCT Pub. No.: WO2010/074145
PCT Pub. Date: Jul. 1, 2010

(65) Prior Publication Data
US 2011/0143660 A1   Jun. 16, 2011

(30) Foreign Application Priority Data
Dec. 26, 2008   (JP) ................. P2008-335048

(51) Int. Cl.
*H04W 68/00* (2009.01)
*H04W 4/00* (2009.01)
*H04W 72/00* (2009.01)
*H04B 1/38* (2006.01)
*G01R 31/08* (2006.01)

(52) U.S. Cl. .......... 455/509; 455/458; 455/574; 455/70; 455/422.1; 455/450; 370/329; 370/230

(58) Field of Classification Search ............ 455/458, 455/574, 70, 422.1, 450; 370/329, 230
See application file for complete search history.

(56) References Cited

U.S. PATENT DOCUMENTS

| | | | |
|---|---|---|---|
| 8,208,950 B2* | 6/2012 | Islam et al. | 455/458 |
| 2004/0203778 A1* | 10/2004 | Kuo et al. | 455/436 |
| 2006/0246883 A1* | 11/2006 | Putcha | 455/419 |
| 2008/0039106 A1* | 2/2008 | Wallentin et al. | 455/450 |
| 2010/0165937 A1* | 7/2010 | Yi et al. | 370/329 |
| 2010/0330995 A1* | 12/2010 | Aoyama et al. | 455/436 |
| 2011/0159895 A1* | 6/2011 | Arzelier et al. | 455/466 |

FOREIGN PATENT DOCUMENTS
JP   2006-311458 A   11/2006

OTHER PUBLICATIONS
International Search Report w/translatioin from PCT/JP2009/071434 dated Feb. 2, 2010 (4 pages).

(Continued)

*Primary Examiner* — Bobbak Safaipour
(74) *Attorney, Agent, or Firm* — Osha Liang LLP

(57) ABSTRACT

A mobile communication method according to the present invention includes the steps of: transmitting, from a mobile station (UE) to a radio base station (eNB), a connection re-establishment request signal to re-establish the connection between the radio base station (eNB) and the mobile station (UE), when the mobile station (UE) detects a failure in the connection; and transmitting, from the mobile station (UE) to the radio base station (eNB), a connection reconfiguration completion signal notifying that processing corresponding to a connection reconfiguration signal is completed, when the mobile station (UE) receives the connection reconfiguration signal from the radio base station (eNB), and when the connection reconfiguration signal contains a release request of a data radio bearer which is not established between the mobile station (UE) and the radio base station (eNB).

4 Claims, 8 Drawing Sheets

OTHER PUBLICATIONS

Written Opinion from PCT/JP2009/071434 dated Feb. 2, 2010 (3 pages).
3GPP TSG-RAN2#61, R2-081111; "RRC Connection Re-establishment"; Motorol et al.; Sorrento, Italy; Feb. 11-15, 2008 (6 pages).
3GPP TS 36.331 V8.4.0; "3rd Generation Partnership Project; Technical Specification Group Radio Access Network; Evolved Universal Terrestrial Radio Access (E-UTRA) Radio Resource Control (RRC); Protocol specification"; Dec. 2008; pp, 49, 75 (3 pages).
Extended Search Report for European Application No. 09834943.4 dated Mar. 31, 2011 (6 pages).
3GPP TSG RAN WG2 RRC Adhoc, Nortel "Radio Link Failure Recovery Signalling", XP-002628579, R2-07552, Vienna, Austria, Dec. 13, 2007 (4 pages).
Office Action for Canadian Application No. 2,725,475 mailed Aug. 30, 2011 (4 pages).
Patent Examination Report for Australian Application No. 2009331223 mailed Jun. 26, 2012 (4 pages).

* cited by examiner

FIG. 3

– RRCConnectionReconfiguration

The RRCConnectionReconfiguration message is the command to modify an RRC connection. It may convey information for measurement configuration, mobility control, dedicated NAS information, radio resource configuration (including RBs, MAC main configuration and physical channel configuration), security configuration and UE related information.

Signalling radio bearer: SRB1
    RLC-SAP: AM
    Logical channel: DCCH
    Direction: E-UTRAN to UE RRCConnectionReconfiguration message

```
— ASN1START

RRCConnectionReconfiguration ::=    SEQUENCE {
    rrc-TransactionIdentifier           RRC-TransactionIdentifier,
    criticalExtensions                  CHOICE {
        c1                              CHOICE {
            rrcConnectionReconfiguration-r8    RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture        SEQUENCE {}
    }
}

RRCConnectionReconfiguration-r8-IEs ::= SEQUENCE {
    measurementConfiguration        MeasurementConfiguration        OPTIONAL,   -- Need ON
    mobilityControlInformation      MobilityControlInformation      OPTIONAL,   -- Need OP
    nas-DedicatedInformationList    SEQUENCE (SIZE (1..maxDRB)) OF
                                    NAS-DedicatedInformation        OPTIONAL,   -- Cond nonHO
    radioresourceConfiguration      RadioResourceConfigDedicated    OPTIONAL,   -- Need ON
    securityConfiguration           SecurityConfiguration           OPTIONAL,   -- Cond HO
    nas-SecurityParamToEUTRA        OCTET STRING (SIZE (6))         OPTIONAL,   -- Cond I-RATHO
    nonCriticalExtension            SEQUENCE {}                     OPTIONAL,   -- Need OP
}

— ASN1STOP
```

| RRCConnectionReconfiguration field descriptions |
|---|
| measurementConfiguration<br>This field specifies measurements to be performed by the UE, and covers intra-frequency, inter-frequency and inter-RAT mobility as well as configuration of measurement gaps. |
| mobilityControlInformation<br>This field includes parameters relevant for network controlled mobility to/within E-UTRA. |
| nas-DedicatedInformationList<br>This field is used to transfer UE specific NAS layer information between the network and the UE. The RRC layer is transparent for each PDU in the list. |
| radioResourceConfiguration<br>This field is used to setup/modify/release RBs, to setup/modify transport channel configurations and to setup/modify physical channels. |
| securityConfigutration<br>This field is used to configure AS integrity protection (CP) and AS ciphering (CP and UP) and to provide the next hop Chaining Count. |
| nas-securityParamToEUTRA<br>This field is used to activate NAS security after inter-RAT handover to E-UTRA. The content is defined in TS 24.301. |

| Conditional presence | Explanation |
|---|---|
| HO | The field is mandatory present if the IE MobilityControlInformation is present in the RRCConnectionReconfiguration message; otherwise the field is not applicable. |
| I-RATHO | The field is mandatory present in case of inter-RAT handover to E-UTRA; otherwise it is not applicable. |
| nonHO | The field is not applicable in case of handover within E-UTRA or to E-UTRA; otherwise it is optional present, continue. |

FIG. 4

- RadioResourceConfigDedicated

The IE RadioResourceConfigDedicated is used to setup/modify/release RBs, to setup/modify transport channel configurations and to setup/modify physical channels RadioResourceConfigDedicated information element

```
-- ASN1START

RadioResourceConfigDedecated  ::=    SEQUENCE {
    srb-ToAddModifyList              SRB-ToAddModifyList         OPTIONAL,   -- need ON
    drb-ToAddModifyList              DRB-ToAddModifyList         OPTIONAL,   -- need ON
    drb-ToReleaseList                DRB-ToReleaseList           OPTIONAL,   -- need ON
    mac-MainConfig                   CHOICE {
        explicitValue                    MAC-MainConfiguration,
        defaultValue                     NULL
    } OPTIONAL,                                                              -- Need ON
    sps-Configuration                SPS-Configuration           OPTIONAL,   -- Need ON
    physicalConfigDedicated          PhysicalConfigDedicated     OPTIONAL,   -- Cond Misc
    ...
}

SRB-ToAddModifyList  ::=             SEQUENCE (SIZE (1..2)) OF SEQUENCE {
    srb-Identity                         INTEGER (1..2),
    rlc-Configuration                    CHOICE {
        explicitValue                        RLC-Configuration,
        defaultValue                         NULL
    } OPTIONAL,                                                              -- Cond Setup
    logicalChannelConfig                 CHOICE {
        explicitValue                        LogicalChannelConfig,
        defaultValue                         NULL
    } OPTIONAL,                                                              -- Cond Setup
    ...
}

DRB-ToAddModifyList  ::=             SEQUENCE (SIZE (1..maxDRB)) OF SEQUENCE {
    eps-BearerIdentity                   INTEGER (0..15)             OPTIONAL,  -- Cond DRB-Setup
    drb-Identity                         INTEGER (1..32),
    pdcp-Configuration                   PDCP-Configuration          OPTIONAL,  -- Cond DRB-Setup
    rlc-Configuration                    RLC-Configuration           OPTIONAL,  -- Cond Setup
    logicalChannelIdentity               INTEGER (3..10)             OPTIONAL,  -- Cond DRB-Setup
    logicalChannelConfig                 LogicalChannelConfig        OPTIONAL,  -- Cond Setup
    ...
}

DRB-ToReleaseList  ::=               SEQUENCE (SIZE (1..maxDRB)) OF SEQUENCE {
    drb-Identity                         INTEGER (1..32)
}

-- ASN1STOP
```

| RadioResourceConfigDedecated field descriptions |
|---|
| rlc-Configutration<br>SRB choice indicates whether the RLC configuration is set to the values signalled explicitly or to the values defined in the default RLC configuration for SRB1 in 9.2.1.1 or for SRB2 9.2.1.2 E-UTRAN does not reconfigure the RLC mode of DRBs. |
| pdcp-Configutration<br>E-UTRAN can reconfigure PDCP header compression for DRBs only when the PDCP re-establishment procedure is performed. |
| mac-MainConfig<br>The default MAC main configuration is specified in 9.2.2. |
| sps-Configutration<br>The default SPS configuration is specified in 9.2.3. |
| physicalConfigDedicated<br>The default dedicated physical configuration is specified in 9.2.4. |
| logicalChannelConfig [in SRB-ToAddModifyList]<br>For SRBs a choice is used to indicate whether the logical channel configuration is signalled explicitly or set to the values defined in the default logical channel configuration for SRB1 in 9.2.1.1 or for SRB2 in 9.2.1.2. |
| logialChannelIdentity<br>The logical channel identity for both UL and DL. |

| Conditional presence | Explanation |
|---|---|
| DRB-Setup | The field is mandatory present if the corresponding DRB is being set up (including bearer setup at handover to E-UTRA) ; otherwise it is not applicable. |
| Setup | The field is mandatory present if the corresponding SRB/DRB is being set up; otherwise the field is optionally present, continue. |
| Misc | The field is mandatory present upon connection establishment, handover within E-UTRA, handover to E-UTRA and connection re-establishment; otherwise the field is optionally present, continue. |

FIG. 5

- MeasurementConfiguration

The IE MeasurementConfiguration specifies measurements to be performed by the UE, and covers intra-frequency, inter-frequency and inter-RAT mobility as well as configuration of measurement gaps.

MeasurementConfiguration information element

```
-- ASN1START

MeasurementConfiguration ::=    SEQUENCE {
    -- Measurement objects
    measObjectToRemoveList          MeasObjectToRemoveList          OPTIONAL,   -- Need ON
    measObjectToAddModifyList       MeasObjectToAddModifyList       OPTIONAL,   -- Need ON
    -- Reporting configurations
    reportConfigToRemoveList        ReportConfigToRemoveList        OPTIONAL,   -- Need ON
    reportConfigToAddModifyList     ReportConfigToAddModifyList     OPTIONAL,   -- Need ON
    -- Measurement identities
    measIdToRemoveList              MeasIdToRemoveList              OPTIONAL,   -- Need ON
    measIdToAddModifyList           MeasIdToAddModifyList           OPTIONAL,   -- Need ON
    -- Otehr parameters
    quantityConfig                  QuantityConfig                  OPTIONAL,   -- Need ON
    measGapConfig                   MeasGapConfig                   OPTIONAL,   -- Need ON
    s-Measure                       RSRP-Range                      OPTIONAL,   -- Need ON
    hrpd-PreRegistrationInfo        HRPD-PreRegistrationInfo        OPTIONAL,   -- Need OP
    neighbourCellConfiguration      NeighbourCellConfiguration      OPTIONAL,   -- Need OP
    speedDependentParameters        CHOICE {
        disable                         NULL,
        enable                          SEQUENCE {
            mobilityStateParameters         MobilityStateParameters,
            speedDependentScalingParameters ConnectedModeSpeedDependentScalingParameters
        }
    }                                                               OPTIONAL,   -- Need ON
    ...
}

MeasIdToRemoveList ::=          SEQUENCE (SIZE (1..maxMeasId)) OF SEQUENCE {
    measId                          MeasId
}

MeasIdToAddModifyList ::=       SEQUENCE (SIZE (1..maxMeasId)) OF SEQUENCE {
    measId                          MeasId,
    measObjectId                    MeasObjectId,
    reportConfigId                  ReportConfigId
}

MeasObjectToRemoveList ::=      SEQUENCE (SIZE (1..maxObjectId)) OF SEQUENCE {
    measObjectId                    MeasObjectId
}

MeasObjectToAddModifyList ::=   SEQUENCE (SIZE (1..maxObjectId)) OF SEQUENCE {
    measObjectId                    MeasObjectId,
    measObject                      CHOICE {
        measObjectEUTRA                 MeasObjectEUTRA,
        measObjectUTRA                  MeasObjectUTRA,
        measObjectGERAN                 MeasObjectGERAN,
        measObjectCDMA2000              MeasObjectCDMA2000,
        ...
    }
}

ReportConfigToRemoveList ::=    SEQUENCE (SIZE (1..maxReportConfigId)) OF SEQUENCE {
    reportConfigId                  ReportConfigId
}

ReportConfigToAddModifyList ::= SEQUENCE (SIZE (1..maxReportConfigId)) OF SEQUENCE {
    reportConfigId                  ReportConfigId,
    reportConfig                    CHOICE {
        reportConfigEUTRA               ReportConfigEUTRA,
        reportConfigInterRAT            ReportConfigInterRAT
    }
}

-- ASN1STOP
```

| MeasurementConfiguration field descriptions |
| --- |
| measObjectToRemoveList |
| List of measurement object to remove. |
| measObjectToAddModifyList |
| List of measurement object to add/modify. |
| measObjectId |
| Used to identify a measurement object configuration |
| measObject |
| Specifies measurement object configurations for E-UTRA, UTRA, GERAN, or CDMA2000 measurements. |
| reportConfigToRemoveList |
| List of measurement reporting configurations to remove. |
| reportConfigToAddModifyList |
| List of measurement reporting configurations to add/modify. |
| reportConfigId |
| Used to identify a measurement reporting configuration. |
| reportConfig |
| Specifies measurement reporting configurations for E-UTRA, UTRA, GERAN, or CDMA2000 measurements |
| measIdToRemoveList |
| List of measurement identities remove. |
| measIdToAddModifyList |
| List of measurement identities to add/modify. |
| measId |
| Used to link a measurement object to a reporting configuration |
| quantityConfig |
| Specifies measurement quantities for UTRA, GERAN, or CDMA2000 and L3 filtering coefficients for E-UTRA, UTRA or GERAN measurements. |
| measGapConfig |
| Used to configure measurement gap pattern and control activation/deactivation of measurement gap. |
| s-Measure |
| Serving cell quality threshold controlling whether or not the UE is required to perform measurements of intra-frequency, inter frequency and inter-RAT neighbouring cells. |
| hrpd-PreResistrationInfo |
| The HRPD Pre-Registration Information tells the UE if it should pre-register with the HRPD network and identifies the Pre-registration zone to the UE. |

…

MOBILE COMMUNICATION METHOD AND MOBILE STATION

TECHNICAL FIELD

The present invention relates to a mobile communication method and a mobile station.

BACKGROUND ART

With reference to FIGS. 8 and 9, two examples are given to describe operations in a mobile communication system of the LTE (long term evolution) scheme specified by the 3GPP at a time when a mobile station UE having a connection #1 established with a radio base station eNB detects an RLF (radio link failure).

First, a first example is described with reference to FIG. 8. As shown in FIG. 8, in a state where a connection including a SRB (signalling radio bearer) and a DRB (data radio bearer) is established between the mobile station UE and the radio base station eNB, the radio base station eNB transmits an "RRC Connection Reconfiguration (connection reconfiguration signal)" including a release request of a DRB #15 to the mobile station UE in Step S3001.

In Step S3002, the mobile station UE performs releasing processing of the DRB #15 in response to the "RRC Connection Reconfiguration", and then transmits an "RRC Connection Reconfiguration Complete (connection reconfiguration completion signal)" to the radio base station eNB, so as to notify that the releasing processing of the DRB #15 is completed.

Thereafter, the mobile station UE detects an RLF before the "RRC Connection Reconfiguration Complete" reaches the radio base station eNB, and transmits an "RRC Connection Re-establishment Request (connection re-establishment request signal)" to the radio base station eNB in Step S3003.

In Step S3004, the radio base station eNB transmits an "RRC Connection Re-establishment (connection re-establishment signal)" to the mobile station UE. In Step S3005, the mobile station UE transmits an "RRC Connection Re-establishment Complete (connection re-establishment completion signal)" to the radio base station eNB. As a result, the connection (SRB1) is re-established between the radio base station eNB and the mobile station UE.

Subsequently, in Step S3006, the radio base station eNB transmits an "RRC Connection Reconfiguration (connection reconfiguration signal)" to the mobile station UE. As a result, a connection (SRB2 and DRB) is re-established between the radio base station eNB and the mobile station UE.

Next, a second example is described with reference to FIG. 9. As shown in FIG. 9, in a state where a connection including an SRB and a DRB is established between the mobile station UE and the radio base station eNB, the mobile station UE detects an RLF in Step S4001, and then the radio base station eNB transmits an "RRC Connection Reconfiguration" including an addition request of a DRB #15 to the mobile station UE in Step S4002.

In such a case, the mobile station UE transmits an "RRC Connection Re-establishment Request" to the radio base station eNB in Step S4003 without performing adding processing of the DRB #15.

In Step S4004, the radio base station eNB transmits an "RRC Connection Re-establishment" to the mobile station UE. In Step S4005, the mobile station UE transmits an "RRC Connection Re-establishment Complete" to the radio base station eNB. As a result, the connection (SRB1) is re-established between the radio base station eNB and the mobile station UE.

Subsequently, in Step S4006, the radio base station eNB transmits an "RRC Connection Reconfiguration" to the mobile station UE. As a result, a connection (SRB2 and DRB) is re-established between the radio base station eNB and the mobile station UE.

DISCLOSURE OF THE INVENTION

Problems To Be Solved By the Invention

However, the operations shown in FIGS. 8 and 9 described above have the following problems.

In the example shown in FIG. 8, in the case where the radio base station eNB transmits an "RRC Connection Reconfiguration" including a release request of the DRB #15 to the mobile station UE in Step S3006, the mobile station UE detects in Step S3007 that its own connection management state does not match with that of the radio base station eNB since the DRB #15 is not established between the mobile station UE and the radio base station eNB. Thereafter, the mobile station UE retransmits an "RRC Connection Re-establishment Request" to the radio base station eNB in Step S3008. This leads to a problem that the mobile station UE repeats the connection re-establishment processing.

Similarly, also in the example shown in FIG. 9, in a case where the radio base station eNB transmits an "RRC Connection Reconfiguration" including a release request of the DRB #15 to the mobile station UE in Step S4006, the mobile station UE detects in Step S4007 that its own connection management state does not match with that of the radio base station eNB since the DRB #15 is not established between the mobile station UE and the radio base station eNB. Thereafter, the mobile station UE retransmits an "RRC Connection Re-establishment Request" to the radio base station eNB in Step S4008. This leads to a problem that the mobile station UE repeats the connection re-establishment processing.

To sum up, the conventional mobile communication system has a problem that the mobile station UE repeats the connection re-establishment processing when the release request or addition request of a DRB included in the "RRC Connection Reconfiguration" does not match with the state in the connection established before the detection of the RLF.

The conventional mobile communication system also has a problem that when the content of an information element "measurementConfiguration" included in the "RRC Connection Reconfiguration" does not match with the state established before the detection of the RLF, the mobile station UE still repeats the connection re-establishment processing.

The present invention was made in consideration of the foregoing problems. An object of the present invention is to provide a mobile communication method and a mobile station which are capable of avoiding the above-described situation of repeating connection re-establishment processing.

Means For Solving the Problem

A first aspect of the present invention is summarized as a mobile communication method for performing communication between a mobile station and a radio base station through a connection including a signalling radio bearer and a data radio bearer, the mobile communication method including the steps of: transmitting, from the mobile station to the radio base station, a connection re-establishment request signal to re-establish the connection between the radio base station and the mobile station, when the mobile station detects a failure in the connection; and transmitting, from the mobile station to the radio base station, a connection reconfiguration completion signal notifying that processing corresponding to a connection reconfiguration signal is completed, when the mobile station receives the connection reconfiguration signal from the radio base station, and when the connection reconfiguration signal contains a release request of a data radio bearer which is not established between the mobile station and the radio base station.

A second aspect of the present invention is summarized as a mobile station configured to communicate with a radio base station through a connection including a signalling radio bearer and a data radio bearer, the mobile station including: a re-establishment processor unit configured to transmit, to the radio base station, a connection re-establishment request signal to re-establish the connection with the radio base station, when detecting a failure in the connection; and a transmitter unit configured to transmit, to the radio base station, a connection reconfiguration completion signal notifying that processing corresponding to a connection reconfiguration signal is completed, when receiving the connection reconfiguration signal from the radio base station, and when the connection reconfiguration signal contains a release request of a data radio bearer which is not established between the mobile station and the radio base station.

A third aspect of the present invention is summarized as a mobile communication method for performing communication between a mobile station and a radio base station through a connection including a signalling radio bearer and a data radio bearer, the mobile communication method including the steps of: transmitting, from the mobile station to the radio base station, a connection re-establishment request signal to re-establish the connection between the radio base station and the mobile station, when the mobile station detects a failure in the connection; and transmitting, from the mobile station to the radio base station, a connection reconfiguration completion signal notifying that processing corresponding to a connection reconfiguration signal is completed, when the mobile station receives the connection reconfiguration signal from the radio base station, and when the connection reconfiguration signal contains a removal request for information regarding measurement reports which are not set in the mobile station.

A fourth aspect of the present invention is summarized as a mobile station configured to communicate with a radio base station through a connection including a signalling radio bearer and a data radio bearer, the mobile station including: a re-establishment processor unit configured to transmit, to the radio base station, a connection re-establishment request signal to re-establish the connection with the radio base station, when detecting a failure in the connection; and a transmitter unit configured to transmit, to the radio base station, a connection reconfiguration completion signal notifying that processing corresponding to a connection reconfiguration signal is completed, when receiving the connection reconfiguration signal from the radio base station, and when the connection reconfiguration signal contains a removal request for information regarding measurement reports which are not set in the mobile station.

Effect of the Invention

As described above, according to the present invention, it is possible to provide a mobile communication method and a mobile station which are capable of avoiding the above-described situation of repeating connection re-establishment processing.

BRIEF DESCRIPTION OF THE DRAWINGS

FIG. 3 is a diagram for explaining an "RRC Connection Reconfiguration" transmitted and received in the mobile communication system according to the first embodiment of the present invention.

FIG. 4 is a diagram for explaining "RadioResourceConfigDedicated" included in the "RRC Connection Reconfiguration" transmitted and received in the mobile communication system according to the first embodiment of the present invention.

FIG. 5 is a diagram for explaining a "Measurement Configuration" transmitted and received in the mobile communication system according to the first embodiment of the present invention.

BEST MODES FOR CARRYING OUT THE INVENTION

Configuration of Mobile Communication System According To First Embodiment of the Invention With reference to FIGS. 1 to 5, a configuration of a mobile communication system according to a first embodiment of the present invention is described.

Figure 1:
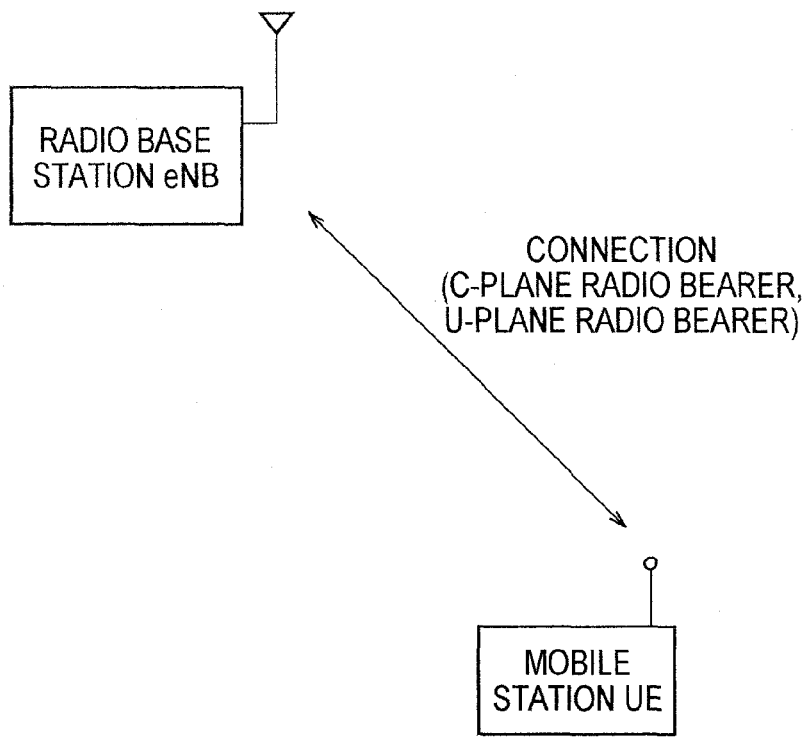
FIG. 1 is an overall configuration diagram of a mobile communication system according to a first embodiment of the present invention.

As shown in FIG. 1, the mobile communication system according to this embodiment is an mobile communication system of the LTE scheme, and is configured to establish a connection between a radio base station eNB and a mobile station UE.

Such a connection includes an SRB as a C-plane radio bearer and a DRB as a U-plane radio bearer.

Figure 2:
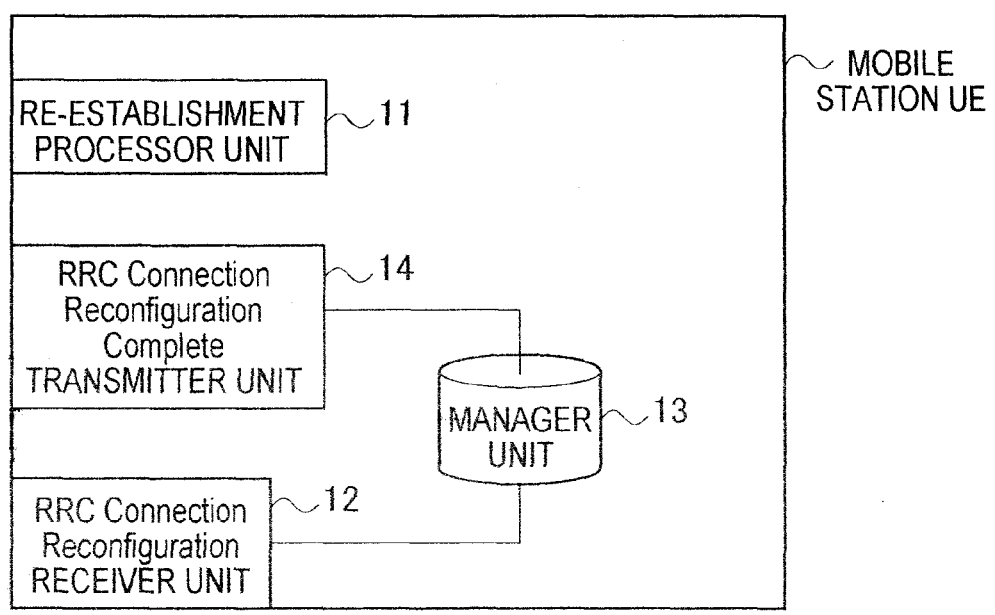
FIG. 2 is a functional block diagram of a mobile station according to the first embodiment of the present invention.

As shown in FIG. 2, the mobile station UE includes a re-establishment processor unit 11, an RRC Connection Reconfiguration receiver unit 12, a manager unit 13, and an RRC Connection Reconfiguration Complete transmitter unit 14.

When detecting a failure (RLF) in the connection established between the mobile station UE and the radio base station eNB, the re-establishment processor unit 11 is configured to transmit an "RRC Connection Re-establishment Request (connection re-establishment request signal)" to the radio base station eNB, and to re-establish such a connection with the radio base station eNB.

The RRC Connection Reconfiguration receiver unit 12 is configured to receive an "RRC Connection Reconfiguration (connection reconfiguration signal)" transmitted by the radio base station eNB.

Here, the "RRC Connection Reconfiguration" is a signal to instruct the mobile station UE to change the configuration of the connection established between the radio base station eNB and the mobile station UE.

For example, as shown in FIG. 3, the "RRC Connection Reconfiguration" includes "radioResourceConfiguration", "measurementConfiguration" and the like as information elements.

Moreover, as shown in FIG. 4, "radioResourceConfiguration (RadioResourceConfigDedicated)" includes "drb-ToAddModifyList", "drb-ToReleaseList" and the like as information elements.

The "drb-ToAddModifyList" is an information element including an addition request and a modification request for one or more DRBs, and the "drb-ToReleaseList" is an information element including a release request for one or more DRBs.

Furthermore, as shown in FIG. 5, the "measurementConfiguration" includes "measObjectToRemoveList", "measObjectToAddModifyList", "reportConfigToRemoveList", "reportConfigToAddModifyList", "measIDToRemoveList", "measIDToAddModifyList" and the like as information elements.

In other words, the "measurementConfiguration" includes information elements including removal request, addition request, and modification request of "information regarding measurement reports".

The "measObjectToRemoveList" is an information element including a removal request for one or more "measurement objects", and the "measObjectToAddModifyList" is an information element including an addition request and a modification request for one or more measurement objects.

Here, the measurement object is information (e.g., a radio access method, a frequency, a PCI (physical cell ID) and the like) for specifying a cell to be measured for its reception quality in the mobile station UE. Note that the measurement object is one of the "information regarding measurement reports" described above.

The "reportConfigToRemoveList" is an information element including a removal request for one or more "report configurations", and the "reportConfigToAddModifyList" is an information element including an addition request and a modification request for one or more report configurations.

Here, the report configuration is information specifying a report configuration for giving the radio base station eNB the measurement report containing the reception quality of the measurement object described above. Note that the report configuration is also one of the "information regarding measurement reports" described above.

Furthermore, the "measIDToRemoveList" is an information element including a removal request for one or more "measurement IDs", and the "measIDToAddModifyList" is an information element including an addition request and a modification request for one or more measurement IDs.

Here, the measurement ID is information for associating the measurement object with the report configuration. Note that the measurement ID is also one of the "information regarding measurement reports" described above.

The manager unit 13 is configured to manage information on the connection established between the mobile station UE and the radio base station eNB. Here, even if an RLF is detected in a specific connection, when re-establishment processing is performed on the specific connection, the manager unit 13 is configured to keep on managing information on the specific connection.

For example, the manager unit 13 is configured to manage "information on the DRB" set in each connection on the basis of the information element "radioResourceConfiguration" in each "RRC Connection Reconfiguration".

Furthermore, the manager unit 13 is configured to manage the "information regarding measurement reports" received through each connection on the basis of the information element "measurementConfiguration" in each "RRC Connection Reconfiguration".

The RRC Connection Reconfiguration Complete transmitter unit 14 is configured to transmit an "RRC Connection Reconfiguration Complete" to the radio base station eNB, the "RRC Connection Reconfiguration Complete" notifying that processing corresponding to the "RRC Connection Reconfiguration" received from the radio base station eNB is completed.

Here, the RRC Connection Reconfiguration Complete transmitter unit 14 may be configured as follows. Even if a release request of a DRB which is not established between the mobile station UE and the radio base station eNB is contained in the information element "drb-ToReleaseList" included in the information element "radioResourceConfiguration" in the "RRC Connection Reconfiguration" received from the radio base station eNB, the RRC Connection Reconfiguration Complete transmitter unit 14 may be configured to ignore such release request, and to transmit the "RRC Connection Reconfiguration Complete" notifying that the processing corresponding to the "RRC Connection Reconfiguration" is completed to the radio base station eNB.

Moreover, the RRC Connection Reconfiguration Complete transmitter unit 14 may be configured as follows. Even if a modification request of a DRE which is not established between the mobile station UE and the radio base station eNB is contained in the information element "drb-ToAddModifyList" included in the information element "radioResourceConfiguration" in the "RRC Connection Reconfiguration" received from the radio base station eNB, the RRC Connection Reconfiguration Complete transmitter unit 14 may be configured to ignore such modification request, and to transmit the "RRC Connection Reconfiguration Complete" notifying that the processing corresponding to the "RRC Connection Reconfiguration" is completed to the radio base station eNB.

In addition, the RRC Connection Reconfiguration Complete transmitter unit 14 may be configured as follows. Even if an addition request of a DRB which is established between the mobile station UE and the radio base station eNB is contained in the information element "drb-ToAddModifyList" included in the information element "radioResourceConfiguration" in the "RRC Connection Reconfiguration" received from the radio base station eNB, the RRC Connection Reconfiguration Complete transmitter 14 may be configured to ignore such addition request, and to transmit the "RRC Connection Reconfiguration Complete" notifying that the processing corresponding to the "RRC Connection Reconfiguration" is completed to the radio base station eNB.

Meanwhile, the RRC Connection Reconfiguration Complete transmitter unit 14 may be configured as follows. Even if a removal request for a measurement object which is not set in the mobile station UE is contained in the information element "MeasObjectToRemoveList" included in the information element "measurementConfiguration" in the "RRC Connection Reconfiguration" received from the radio base station eNB, the RRC Connection Reconfiguration Complete transmitter unit 14 may be configured to ignore such removal request, and to transmit the "RRC Connection Reconfiguration Complete" notifying that the processing corresponding to the "RRC Connection Reconfiguration" is completed to the radio base station eNB.

Moreover, the RRC Connection Reconfiguration Complete transmitter unit 14 may be configured as follows. Even if a modification request for a measurement object which is not set in the mobile station UE is contained in the information element "MeasObjectToAddModifyList" included in the information element "measurementConfiguration" in the "RRC Connection Reconfiguration" received from the radio base station eNB, the RRC Connection Reconfiguration Complete transmitter unit 14 may be configured to ignore such modification request, and to transmit the "RRC Connection Reconfiguration Complete" notifying that the processing corresponding to the "RRC Connection Reconfiguration" is completed to the radio base station eNB.

Furthermore, the RRC Connection Reconfiguration Complete transmitter unit 14 may be configured as follows. Even if an addition request for a measurement object which is set in the mobile station UE is contained in the information element "MeasObjectToAddModifyList" included in the information element "measurementConfiguration" in the "RRC Connection Reconfiguration" received from the radio base station eNB, the RRC Connection Reconfiguration Complete transmitter unit 14 may be configured to ignore such addition request, and to transmit the "RRC Connection Reconfiguration Complete" notifying that the processing corresponding to the "RRC Connection Reconfiguration" is completed to the radio base station eNB.

In addition, the RRC Connection Reconfiguration Complete transmitter unit 14 may be configured as follows. Even if a removal request for a report configuration which is not set in the mobile station UE is contained in the information element "reportConfigToRemoveList" included in the information element "measurementConfiguration" in the "RRC Connection Reconfiguration" received from the radio base station eNB, the RRC Connection Reconfiguration Complete transmitter unit 14 may be configured to ignore such removal request, and to transmit the "RRC Connection Reconfiguration Complete" notifying that the processing corresponding to the "RRC Connection Reconfiguration" is completed to the radio base station eNB.

Moreover, the RRC Connection Reconfiguration Complete transmitter unit 14 may be configured as follows. Even if a modification request for a report configuration which is not set in the mobile station UE is contained in the information element "reportConfigToAddModifyList" included in the information element "measurementConfiguration" in the "RRC Connection Reconfiguration" received from the radio base station eNB, the RRC Connection Reconfiguration Complete transmitter unit 14 may be configured to ignore such modification request, and to transmit the "RRC Connection Reconfiguration Complete" notifying that the processing corresponding to the "RRC Connection Reconfiguration" is completed to the radio base station eNB.

Furthermore, the RRC Connection Reconfiguration Complete transmitter unit 14 may be configured as follows. Even if an addition request for a report configuration which is set in the mobile station UE is contained in the information element "reportConfigToAddModifyList" included in the information element "measurementConfiguration" in the "RRC Connection Reconfiguration" received from the radio base station eNB, the RRC Connection Reconfiguration Complete transmitter unit 14 may be configured to ignore such addition request, and to transmit the "RRC Connection Reconfiguration Complete" notifying that the processing corresponding to the "RRC Connection Reconfiguration" is completed to the radio base station eNB.

In addition, the RRC Connection Reconfiguration Complete transmitter unit 14 may be configured as follows. Even if a removal request for a measurement ID which is not set in the mobile station UE is contained in the information element "measIdToRemoveList" included in the information element "measurementConfiguration" in the "RRC Connection Reconfiguration" received from the radio base station eNB, the RRC Connection Reconfiguration Complete transmitter unit 14 may be configured to ignore such removal request, and to transmit the "RRC Connection Reconfiguration Complete" notifying that the processing corresponding to the "RRC Connection Reconfiguration" is completed to the radio base station eNB.

Moreover, the RRC Connection Reconfiguration Complete transmitter unit 14 may be configured as follows. Even if a modification request for a measurement ID which is not set in the mobile station UE is contained in the information element "measIdToAddModifyList" included in the information element "measurementConfiguration" in the "RRC Connection Reconfiguration" received from the radio base station eNB, the RRC Connection Reconfiguration Complete transmitter unit 14 may be configured to ignore such modification request, and to transmit the "RRC Connection Reconfiguration Complete" notifying that the processing corresponding to the "RRC Connection Reconfiguration" is completed to the radio base station eNB.

Furthermore, the RRC Connection Reconfiguration Complete transmitter unit 14 may be configured as follows. Even if an addition request for a measurement ID which is set in the mobile station UE is contained in the information element "measIdToAddModifyList" included in the information element "measurementCongiguration" in the "RRC Connection Reconfiguration" received from the radio base station eNB, the RRC Connection Reconfiguration Complete transmitter unit 14 may be configured to ignore such addition request, and to transmit the "RRC Connection Reconfiguration Complete" notifying that the processing corresponding to the "RRC Connection Reconfiguration" is completed to the radio base station eNB.

Figure 6:
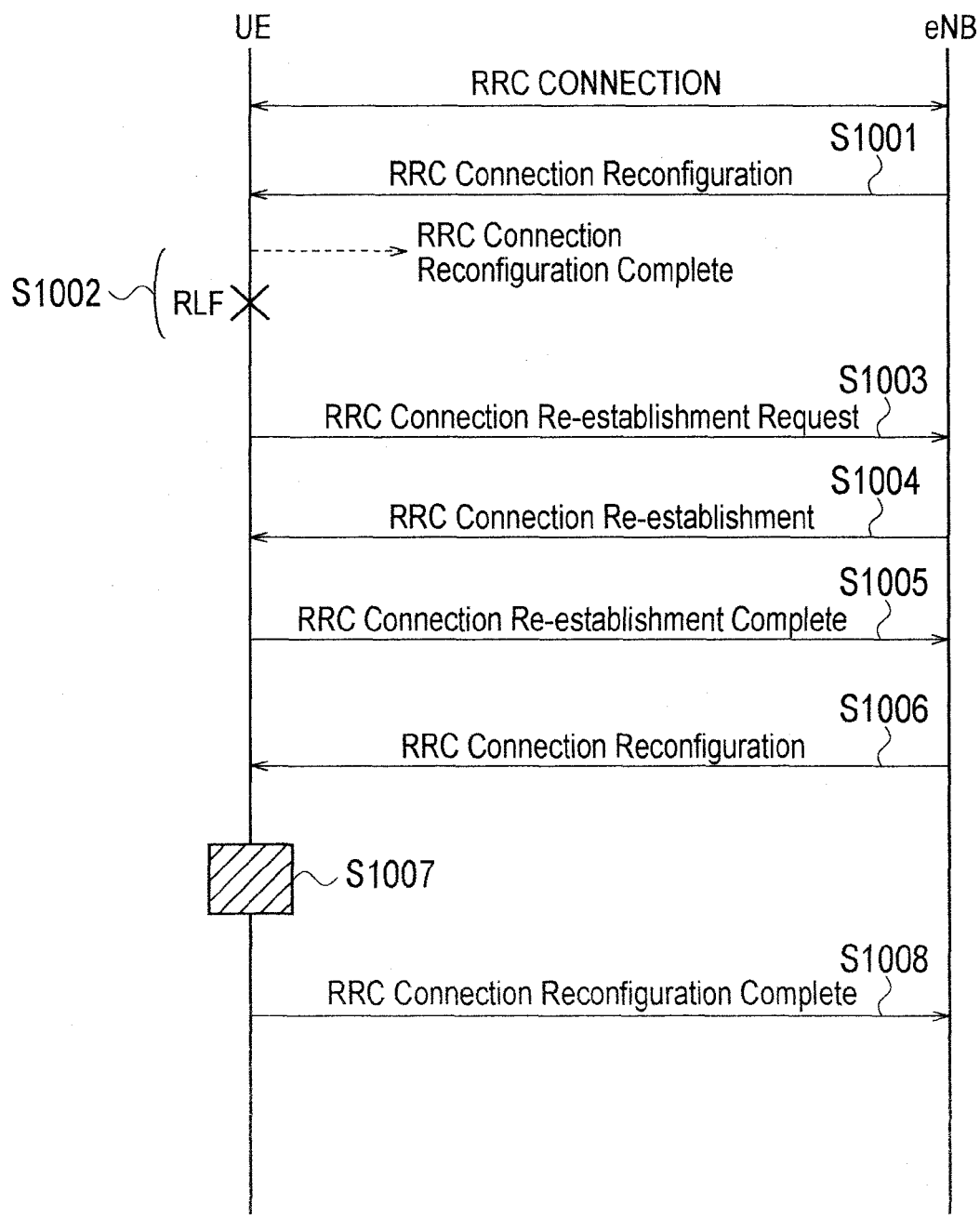
FIG. 6 is a sequence diagram showing operations of the mobile communication system according to the first embodiment of the present invention.
Figure 7:
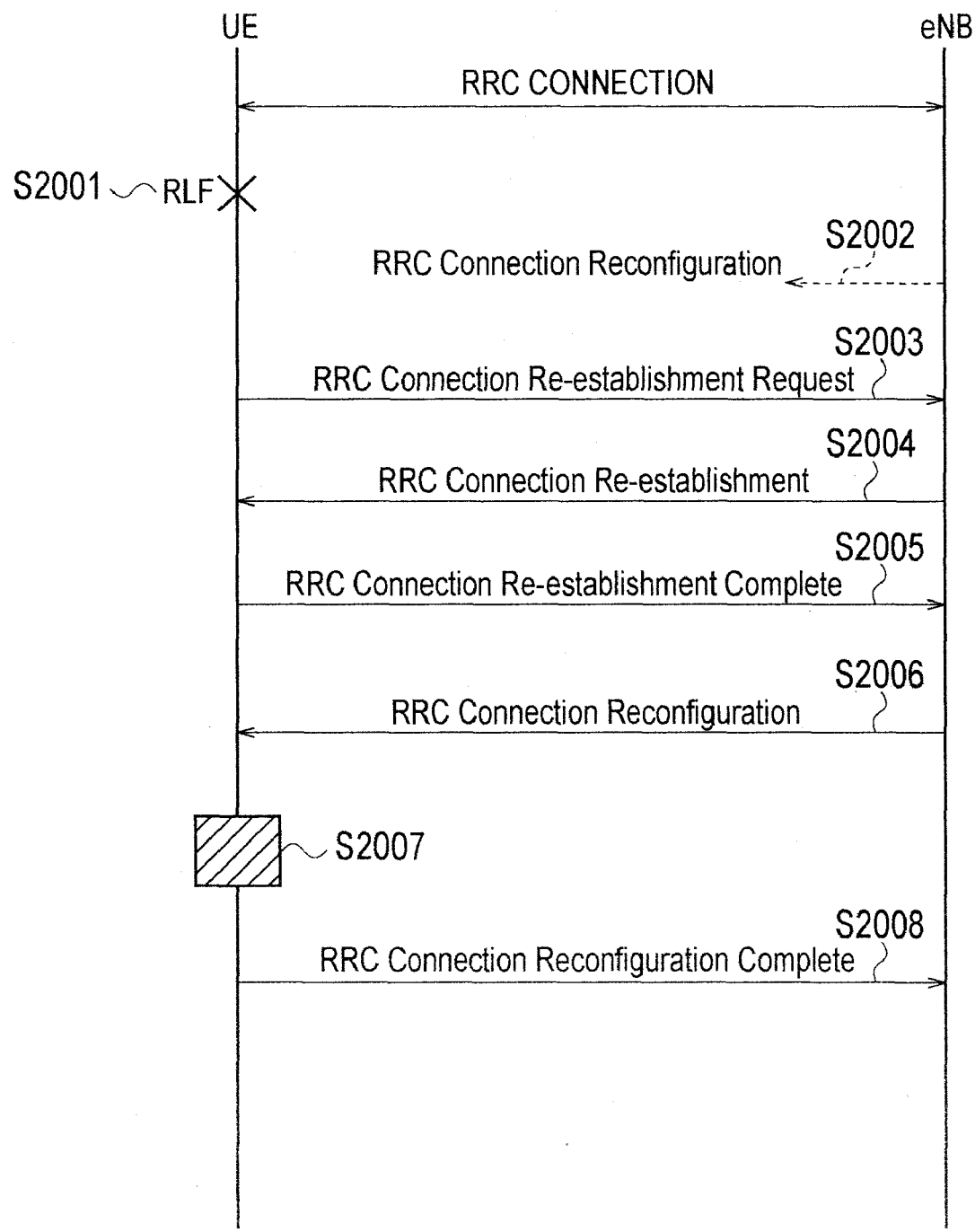
FIG. 7 is a sequence diagram showing operations of the mobile communication system according to the first embodiment of the present invention.
Figure 8:
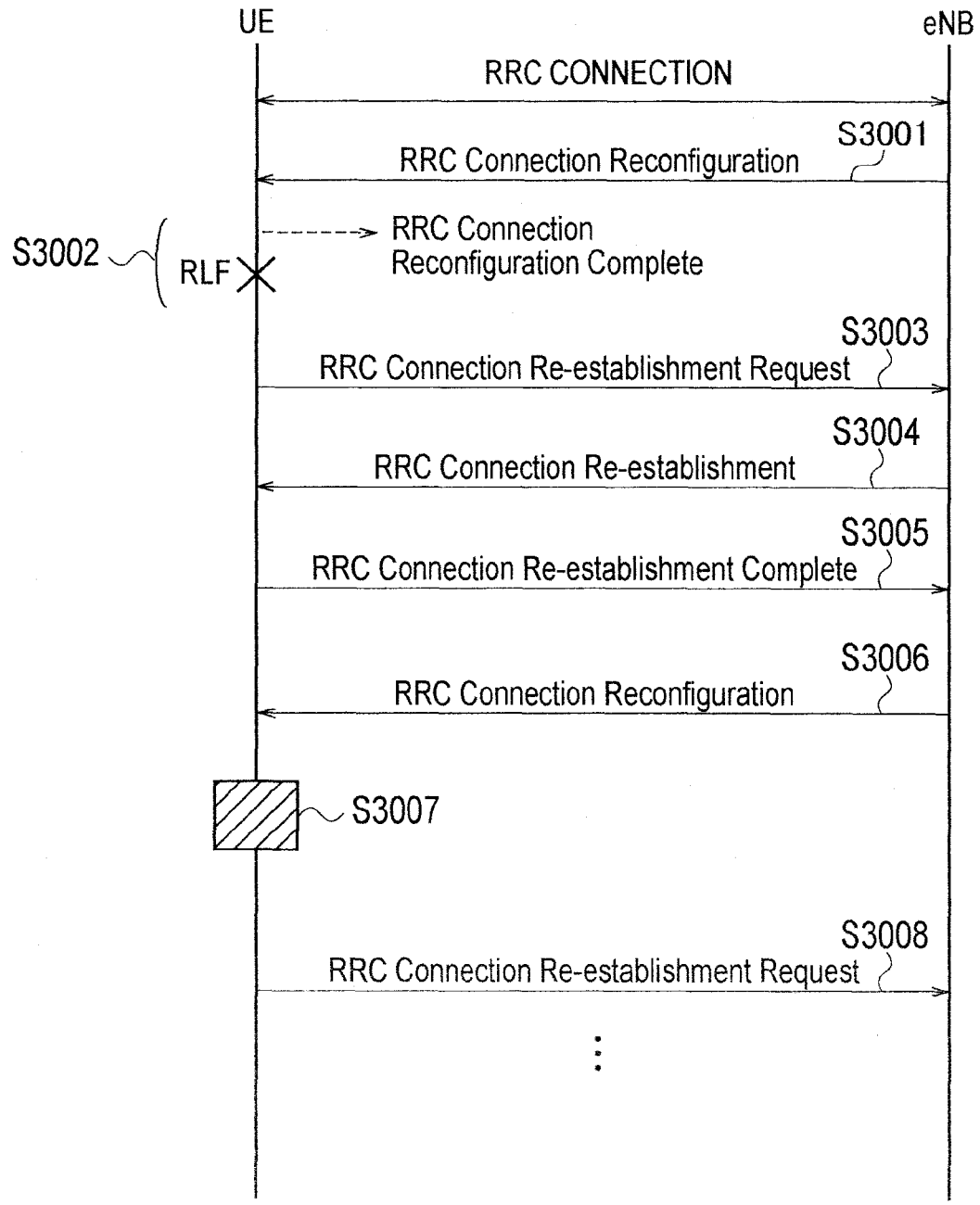
FIG. 8 is a sequence diagram showing operations of a conventional mobile communication system.
Figure 9:
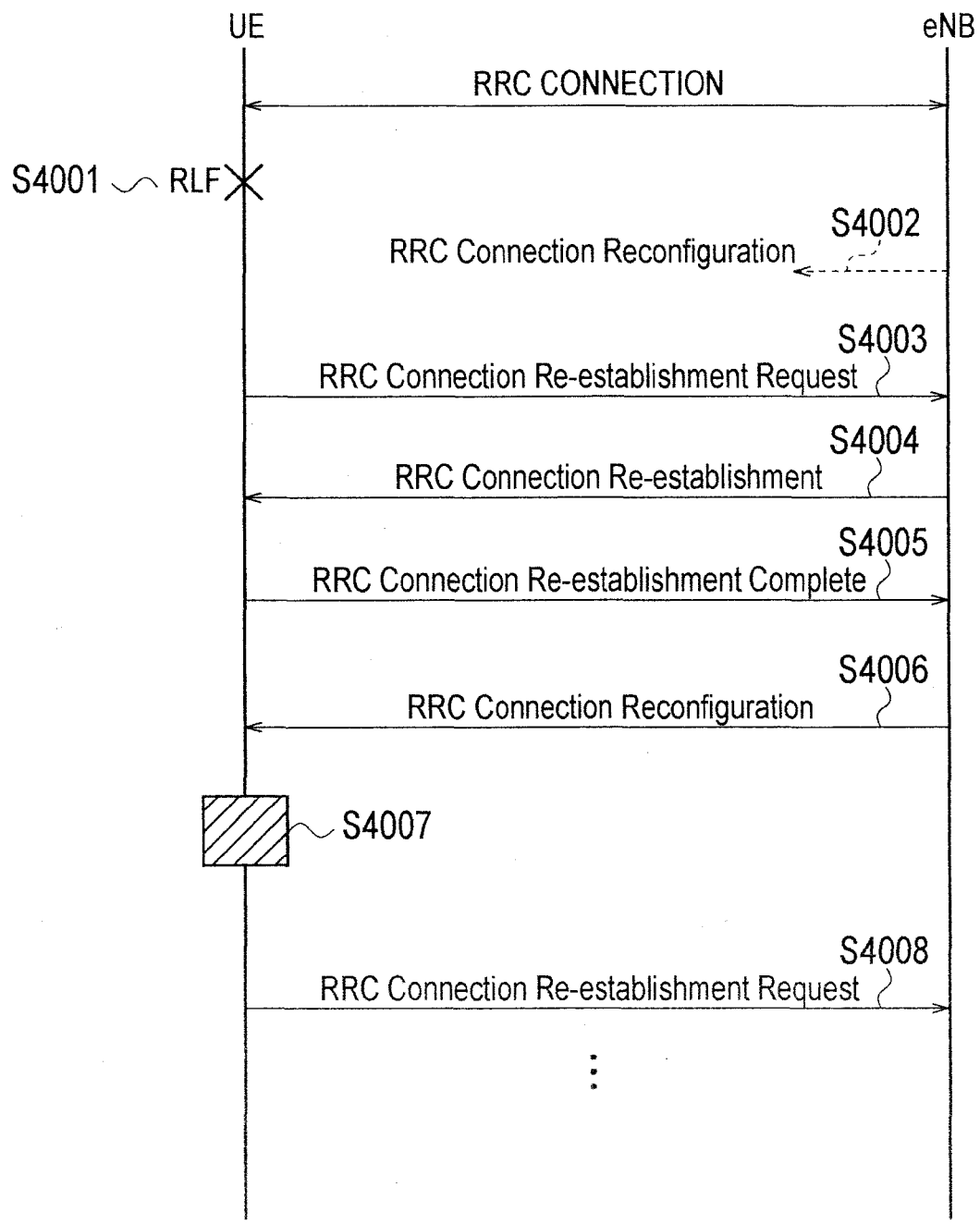
FIG. 9 is a sequence diagram showing operations of the conventional mobile communication system.

Operations of Mobile Communication System
According To First Embodiment of the Invention With reference to FIGS. 6 and 7, two examples are given to describe operations of the mobile communication system according to the first embodiment of the present invention.

First, a first example is described with reference to FIG. 6. As shown in FIG. 6, in a state where a connection including an SRB and a DRB is established between the mobile station UE and the radio base station eNB, the radio base station eNB transmits an "RRC Connection Reconfiguration" including a release request of a DRB #15 or a removal request of a measurement object #1 to the mobile station UE in Step S1001.

In Step S1002, the mobile station UE performs releasing processing of the DRB #15 or removing processing the measurement object #1 in response to the "RRC Connection Reconfiguration", and then transmits an "RRC Connection Reconfiguration Complete" to the radio base station eNB, so as to notify that the releasing processing of the DRB #15 or the removing processing of the measurement object #1 is completed.

Thereafter, the mobile station UE detects an RLF before the "RRC Connection Reconfiguration Complete" reaches the radio base station eNB, and transmits an "RRC Connection Re-establishment Request" to the radio base station eNB in Step S1003.

In Step S1004, the radio base station eNB transmits an "RRC Connection Re-establishment" to the mobile station UE. In Step S1005, the mobile station UE transmits an "RRC Connection Re-establishment Complete" to the radio base station eNB. As a result, the connection (SRB1) is re-established between the radio base station eNB and the mobile station UE.

Thereafter, in Step S1006, the radio base station eNB transmits the "RRC Connection Reconfiguration" including the release request of the DRB #15 or the removal request of the measurement object #1 to the mobile station UE.

Even when determining in Step S1007 that the DRB #15 is not established between the mobile station UE and the radio base station eNB or that the measurement object #1 is not set in the mobile station UE in the state before detection of the RLF, i.e., even when detecting that a connection management state or a reception quality measurement method management state does not match with the radio base station eNB, the mobile station UE transmits an "RRC Connection Reconfiguration Complete" notifying that processing corresponding to the "RRC Connection Reconfiguration" is completed to the radio base station eNB in Step S1008.

As a result, a connection (SRB2 and DRE) is re-established between the radio base station eNB and the mobile station UE without repeating the connection re-establishment processing.

Next, a second example is described with reference to FIG. 7. As shown in FIG. 7, in a state where a connection including an SRB and a DRB is established between the mobile station UE and the radio base station eNB, the mobile station UE detects an RLF in Step S2001, and then the radio base station eNB transmits an "RRC Connection Reconfiguration" including an addition request of a DRB #15 or an addition request of a measurement object #1 to the mobile station UE in Step S2002.

In such a case, the mobile station UE transmits an "RRC Connection Re-establishment Request" to the radio base station eNB in Step S2003 without performing adding processing of the DRB #15 or the measurement object #1.

In Step S2004, the radio base station eNB transmits an "RRC Connection Re-establishment" to the mobile station UE. In Step S2005, the mobile station UE transmits an "RRC Connection Re-establishment Complete" to the radio base station eNB. As a result, the connection (SRB1) is re-established between the radio base station eNB and the mobile station UE.

Thereafter, in Step S2006, the radio base station eNB transmits the "RRC Connection Reconfiguration" including the release request of the DRB #15 or the removal request of the measurement object #1 to the mobile station UE.

Even when determining in Step S2007 that the DRB #15 is not established between the mobile station UE and the radio base station eNB or that the measurement object #1 is not set in the mobile station UE in the state before detection of the RLF, i.e., even when detecting that a connection management state or a reception quality measurement method management state does not match with the radio base station eNB, the mobile station UE transmits an "RRC Connection Reconfiguration Complete" notifying that processing corresponding to the "RRC Connection Reconfiguration" is completed to the radio base station eNB in Step S2008.

As a result, a connection (SRB2 and DRB) is re-established between the radio base station eNB and the mobile station UE without repeating the connection re-establishment processing.

Advantageous Effects of Mobile Communication System According To First Embodiment of the Invention According to the first embodiment of the present invention, in the operation when the mobile station UE has detected an RLF, even when determining that the DRB #15 is not established between the mobile station UE and the radio base station eNB or that the measurement object #1 is not set in the mobile station UE in the state before the detection of the RLF, i.e., even when detecting that a connection management state or a reception quality measurement method management state does not match with the radio base station eNB, the mobile station UE can notify that the processing corresponding to the "RRC Connection Reconfiguration" is completed by transmitting the "RRC Connection Reconfiguration Complete" to the radio base station eNB. Thus, a problem of repeating the connection re-establishment processing can be resolved.

Note that operation of the above described mobile station UE and the radio base station eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE and the radio base station eNB. Also, the storage medium and the processor may be provided in the mobile station UE and the radio base station eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method for performing communication between a mobile station and a radio base station through a connection including a signaling radio bearer and a data radio bearer, the mobile communication method comprising:
   transmitting, from the mobile station to the radio base station, a connection re-establishment request signal to re-establish the connection between the radio base station and the mobile station, when the mobile station detects a failure in the connection;
   receiving, at the mobile station from the radio base station, a connection reconfiguration signal containing a release request of a data radio bearer which is not established between the mobile station and the radio base station;
   ignoring, at the mobile station, the release request of the data radio bearer which is not established between a mobile station and the radio base station; and
   transmitting, from the mobile station to the radio base station, a connection reconfiguration completion signal notifying that processing corresponding to a connection reconfiguration signal is completed.

2. A mobile station configured to communicate with a radio base station through a connection including a signaling radio bearer and a data radio bearer, the mobile station comprising:

a re-establishment processor unit configured to transmit, to the radio base station, a connection re-establishment request signal to re-establish the connection with the radio base station, when detecting a failure in the connection;

a receiver unit configured to receive a connection reconfiguration signal from the radio base station containing a release request of a data radio bearer which is not established between the mobile station and the radio base station; and a transmitter unit configured to ignore the release request of the data radio bearer which is not established between a mobile station and the radio base station and to transmit, to the radio base station, a connection reconfiguration completion signal notifying that processing corresponding to a connection reconfiguration signal is completed.

3. A mobile communication method for performing communication between a mobile station and a radio base station through a connection including a signaling radio bearer and a data radio bearer, the mobile communication method comprising:

transmitting, from the mobile station to the radio base station, a connection re-establishment request signal to re-establish the connection between the radio base station and the mobile station, when the mobile station detects a failure in the connection;

receiving, at the mobile station from the radio base station, a connection reconfiguration signal containing a removal request for information regarding measurement reports which are not set in the mobile station;

ignoring, at the mobile station, the removal request for information regarding measurement reports which are not set in the mobile station; and transmitting, from the mobile station to the radio base station, a connection reconfiguration completion signal notifying that processing corresponding to a connection reconfiguration signal is completed.

4. A mobile station configured to communicate with a radio base station through a connection including a signalling radio bearer and a data radio bearer, the mobile station comprising:

a re-establishment processor unit configured to transmit, to the radio base station, a connection re-establishment request signal to re-establish the connection with the radio base station, when detecting a failure in the connection;

a receiver unit configured to receive a connection reconfiguration signal from the radio base station containing a removal request for information regarding measurement reports which are not set in the mobile station;

a transmitter unit configured to ignore the removal request for information regarding measurement reports which are not set in the mobile station and to transmit, to the radio base station, a connection reconfiguration completion signal notifying that processing corresponding to a connection reconfiguration signal is completed.

* * * * *